March 22, 1960 W. STELZER 2,929,363
BOOSTER BRAKE MECHANISM
Filed Aug. 6, 1956 2 Sheets-Sheet 1
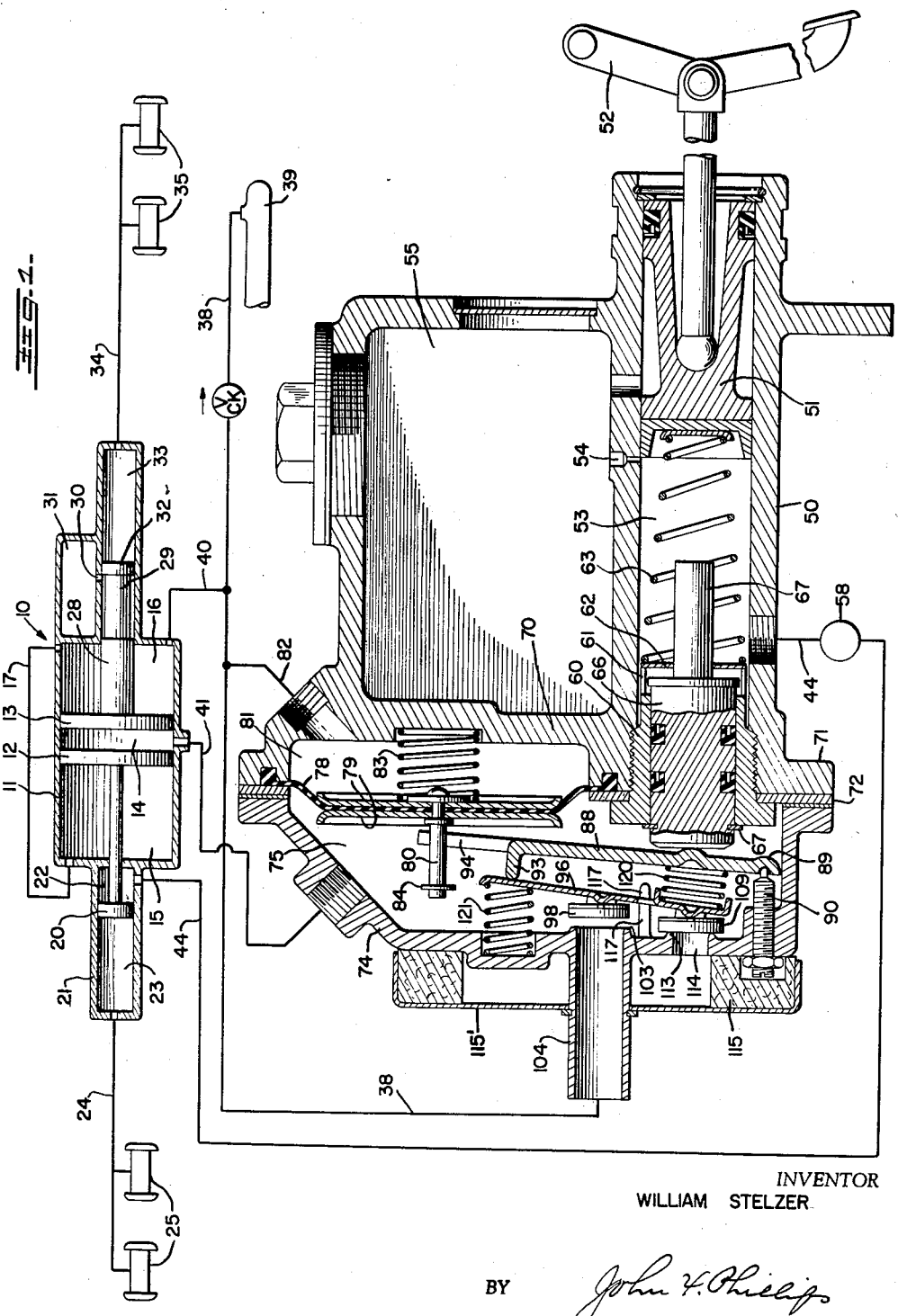
INVENTOR
WILLIAM STELZER
BY John F. Phillips
ATTORNEY

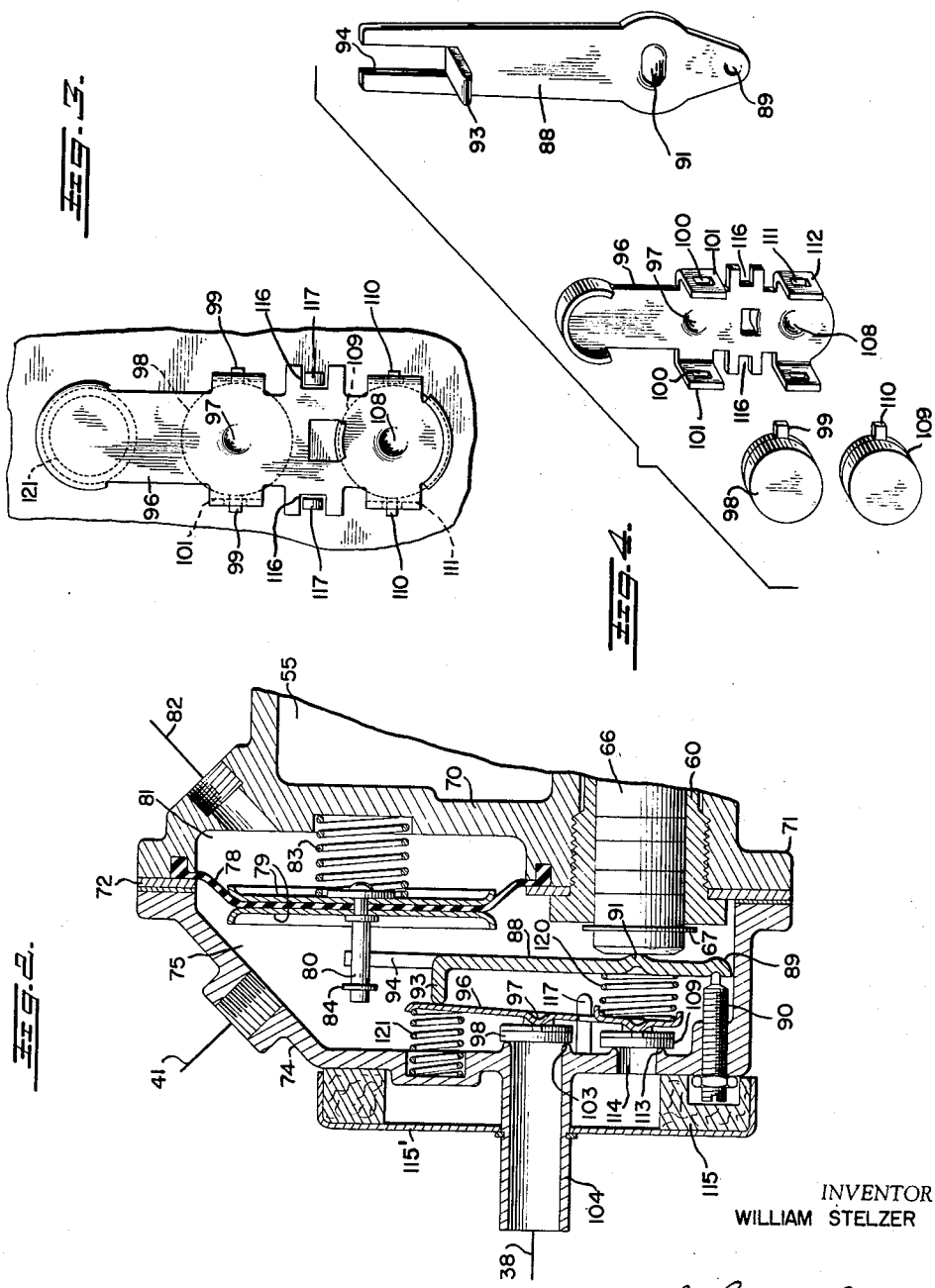

United States Patent Office 2,929,363
Patented Mar. 22, 1960

2,929,363
BOOSTER BRAKE MECHANISM

William Stelzer, Bloomfield Hills, Mich., assignor to Kelsey-Hayes Company, a corporation of Delaware Application August 6, 1956, Serial No. 602,259

19 Claims. (Cl. 121—41)

This invention relates to a booster brake mechanism.

In the copending application of David T. Ayers, Jr., and Edward Govan Hill, Serial No. 474,804, filed December 13, 1954, there is shown and claimed a booster brake mechanism wherein a dual piston motor is provided with fluid displacing plungers connected to the respective pistons. Each plunger is operable for displacing fluid into one set of wheel cylinders, and both pistons are operable by fluid pressure supplied to the booster motor by a valve mechanism which, in turn, is operated by fluid displaced from a conventional master cylinder by a pedal. In such system, master cylinder fluid also flows back of one of the fluid displacing plungers referred to, to assist the corresponding piston in generating pressures in the corresponding set of wheel cylinders.

Such an apparatus has been found to operate with a high degree of efficiency and is highly flexible in its application for vehicles of different types and to take care of different brake operating conditions. In the event of a failure in the system of such type that the valve mechanism will not operate to supply pressure to the booster motor to operate the pistons therein, it is necessary to provide some auxiliary means, operable by the brake pedal, for insuring the energization of the booster motor to apply the brakes. This usually is done through the medium of a so-called dump valve having an operating stem in the path of travel of the brake pedal and beyond its normal limit of movement so that if operation of the pedal fails to generate master cylinder pressure for operating the valve mechanism or for any other reason, the pedal will move beyond its normal limit of movement to open the dump valve to admit higher pressure to the motor to effect operation of the pistons thereof.

An important object of the present invention is to provide a braking system of the general character referred to wherein the use of a dump valve is eliminated and actuation of the booster motor piston or pistons is assured if the pedal moves beyond its normal limit of movement and the normal operation of the system fails to take place.

A further object is to provide such a mechanism wherein the control valve mechanism is subject to operation by pedal generated pressures in the master cylinder and to provide means operable upon a failure in such pressure for mechanically operating the valve mechanism to energize the booster motor.

A further object is to provide such a system wherein the valve mechanism is combined with the pedal operable master cylinder and includes a valve operating plunger directly operable by master cylinder pressures, and to provide for the direct mechanical actuation of the valve operating plunger by the conventional master cylinder plunger if the latter fails to generate pressure necessary to actuate the valve operating plunger.

A further object is to provide such a system which is characterized by the used of a "soft" initial brake pedal and to provide automatic reaction against the master cylinder plunger after initial engagement of the brake shoes with the brake drums.

A further object is to provide such a system wherein the reaction means is of the elastic fluid type and comprises a diaphragm which, because of the nature of the valve mechanism, can be made relatively small.

Other objects and advantages of the invention will become apparent during the course of the following description.

In the drawings I have shown one embodiment of the invention. In this showing:

Figure 1 is an axial sectional view through the master cylinder and valve mechanism, the remaining portions of the system being diagrammatically illustrated and the valve parts being shown in normal positions;

Figure 2 is a fragmentary sectional view of the valve mechanism showing the valve parts in lap position;

Figure 3 is a fragmentary face view of a valve operating beam and associated element; and Figure 4 is an exploded perspective view of parts of the valve mechanism.

Referring to Figure 1, the numeral 10 designates a booster motor as a whole of the general type, aside from the valve mechanism, shown in copending application Serial No. 474,804, referred to above. The motor comprises preferably a single elongated cylinder 11 in which is arranged a pair of pistons 12 and 13 defining therebetween a variable pressure chamber 14. The opposite sides of the pistons 12 and 13 form with the respective ends of the cylinder 11 constant pressure chambers 15 and 16. These chambers are connected by a jumper line 17 to maintain the same pressure in such chambers at all times.

The piston 12 is connected to a plunger 20 operable in the cylinder 21 divided by the plunger 20 to form a pair of chambers 22 and 23 the latter of which is connected by suitable hydraulic lines 24 to one set of wheel cylinders 25.

The plunger 13 is connected to a piston rod 28 having a portion 29 of reduced diameter to which hydraulic fluid can flow through a port 30 from a reservoir 31. The piston rod 28 carries a plunger 32 movable into a chamber 33 to displace fluid through hydraulic lines 34 to the other set of wheel cylinders 35.

The motor 10 in the present instance is vacuum operated. A vacuum line 38 is connected to a source of vacuum such as the vehicle intake manifold 39 and a branch line 40 is connected between the line 38 and the motor chamber 16. This chamber is in constant communication with the chamber 15 through the jumper line 17 and, accordingly, vacuum is present at all times in the chambers 15 and 16. The pressure in the chamber 14 is controlled through a fluid line 41 in a manner to be described.

Hydraulic fluid flows through a line 44 into the chamber 22 in a manner to be described. The plunger 20 preferably is of the type which provides for the flow of hydraulic fluid from the chamber 22 into the chamber 23 during the initial braking operation, as fully disclosed in the copending application referred to above. It will be apparent that the present system is particularly intended for use with a motor 10 of the dual type illustrated. However, the system is also applicable to a booster motor having a single pressure responsive unit operable for displacing fluid to all the wheel cylinders of the vehicle.

A master cylinder 50 is provided therein with a conventional plunger 51 connected to be operated by the usual brake pedal 52. Movement of the plunger 51 builds up pressure in a hydraulic chamber 53 formed in the master cylinder, and this chamber, when the plunger 51 is in normal position as in Figure 1, is adapted to have its hydraulic fluid replenished through a port 54 in the usual manner, this port communicating with a conventional reservoir 55.

The chamber 53 communicatese with one end of the line 44, and this line preferably is provided in any desired manner with a conventional residual pressure valve 58 forming per se no part of the present invention. To the left of the connection of the line 44 with the chamber 53, a plug 60 is threaded into the master cylinder 50 and is provided with fingers 61 engaging a spring seat 62. A spring 63 engages at one end against the seat 62 and at its opposite end against the plunger 51 to bias the latter to its normal off position. The plug 60 has formed therein a cylinder receiving a plunger 66 carrying a snap ring 67 limiting its movement to the right as viewed in Figure 1. The plunger 66 obviously is movable to the left in Figure 1 by pressure generated in the chamber 53. The plunger 66 is provided with an axial extension 67, projecting through the spring seat 62, and engageable by the plunger 51 to be moved thereby if this plunger moves beyond its normal limit of travel as described in detail below.

One wall 70 of the reservoir 55 is provided with an annular flange 71 against which seats a plate 72 apertured to receive the plug 66 and against which seats the head of such plug. To the flange 71 is secured a cover member 74 having therein a chamber 75 in constant communication with the fluid line 41.

The plate 72 secures in position relative to the flange 71 a flexible diaphragm 78 the central portion of which is secured between plates 79 carrying an axial stem 80. One side of the diaphragm 78 is subject to pressure in the chamber 75 and the other side of the diaphragm forms one wall of a vacuum chamber 81 in constant communication through a branch line 82 with the vacuum line 38. A spring 83 is interposed between the wall 70 and the adjacent plate 79 to bias the diaphragm 78 to its normal position shown in Figure 1. The stem 80 projects substantially to the left of the diaphragm 78 as viewed in Figure 1 and is provided with an abutment 84 preferably in the form of a snap ring, for a purpose to be described.

The valve mechanism for the motor 10 is housed within the chamber 75. A lever 88 is provided at one end with a depression 89 (Figure 4) engageable by the end of a threaded adjustable fulcrum screw 90. At a point spaced from the depression 89, the lever 88 is provided with a stamped elongated rib 91 (Figure 4) abutting the adjacent end of the plunger 66. At a point spaced from the end thereof opposite the depression 89, the lever 38 is provided with a laterally extending finger 93 beyond which the lever is bifurcated as at 94 and loosely straddles the stem 80.

The finger 93 engages and operates a beam 96 shown in detail in Figure 4. Intermediate its ends, the beam 96 is provided with a hemispherical boss 97 engageable with a vacuum valve 98 the body of which is provided with oppositely extending trunnions 99 loosely received in openings 100 formed in ears 101 integral with the beam 96. The ears 101 support the vacuum valve, and the boss 97, engaging the body of the vacuum valve, insures its proper engagement with a valve seat 103 formed on the cover member 74. This valve seat is formed on the inner end of a tubular extension 104 carried by the cover member 74 and in fixed communication with the vacuum line 38. When the vacuum valve 98 is in its normal open position, therefore, vacuum is present in the chamber 75.

At its lower end the beam 96 is provided with a stamped hemispherical boss 108 engageable with the body of an air valve 109 having outstanding trunnions 110 engageable in openings 111 formed in ears 112 carried by the beam 96. The valve 109 engages the seat 113 formed on the inner end of the port 114. Air is supplied to this port through an air cleaner 115 which is preferably annular and maintained within a sheet metal cup 115' carried by the cover member 74.

Between the valves 98 and 109, the beam 96 is provided at its opposite edges with notches 116 receiving integral guides 117 carried by the cover member 74 (Figure 3). These guides support the beam 96 for rocking movement, as will be apparent.

A spring 120 engages the lower end of the beam 96 to urge the air valve 109 to closed position. This spring also engages the lever 88 and acts as a return spring to bias the plunger 66 to its normal position shown in Figure 1. The spring 120 obviously must be of sufficient strength to seat the valve 109 against air pressure in the port 114. At the side of the beam 96 opposite the finger 93 is arranged a spring 121, engaging at one end against the beam 96 and having its other end seated against the cover member 74.

*Operation*

The parts normally occupy the positions shown in Figure 1. The valve 98 will be open and the air valve 109 will be closed, and accordingly vacuum will exist in the chamber 75 to balance the constant vacuum in chamber 81. The spring 83 thus will bias the diaphragm 78 to its normal position. Since vacuum will be present in the chamber 75, the motor chamber 14 also will be evacuated and pressures will be balanced in the chambers 14, 15 and 16. Accordingly, the pistons 12 and 13 will be in the normal positions shown in Figure 1.

When the brakes are to be applied, the operator will press the pedal 52 in the usual way, thus moving the master cylinder plunger 51 to the left in Figure 1. This movement closes the port 54 in accordance with conventional practice, and builds up pressure in the chamber 53. Fluid will be displaced from such chamber through the line 44 into the hydraulic chamber 22 and in accordance with the disclosure in the copending application Serial No. 474,804, referred to above, hydraulic fluid will flow through or past the plunger 20 and into the brake lines 24 until later pressures in the chamber 23 exceed pressures in the chamber 22. The specific means for providing for the flow of fluid from the chamber 22 to the chamber 23 is of no particular importance. Such means, for example, may be in the form of a check valve in the plunger 20, normally opened when the parts are in normal position, as shown in the patent to Jeannot G. Ingres, No. 2,805,647. Alternatively, the movement of fluid referred to may take place by the flow of fluid around the lip of a sealing cup as shown, for example, in the patent to Edward G. Hill, No. 2,845,147. The building-up of pressure in the chamber 53 by the plunger 51 exerts a force against the plunger 66 to move it to the left. This movement is imparted to the lever 88 which rocks on the adjustable fulcrum screw 90, and the upper end of the lever 88 will move to the left in Figure 1. Movement will be imparted by the finger 93 to the upper end of the beam 96. The lower end of this beam will rock on the boss 108, and the vacuum valve 98 will be moved into engagement with its seat 103, as shown in Figure 2. The valves are now in lap position.

Further movement imparted to the upper end of the beam 96 will cause the beam to rock on the boss 97, thus relieving pressure of the spring 120 from the air valve 109, whereupon air pressure in the port 114 will move the air valve from its seat and air will flow into the chamber 75 and thence through line 41 into the motor chamber 14. Both pistons 12 and 13 will then start to move, the movement of the pistons being away from each other to actuate their respective plungers 20 and 32. Thus fluid will be displaced from chambers 23 and 33 through their respective lines 24 and 34 into the wheel cylinders to operate the brakes. Fluid pressure in the chamber 22, generated by the master cylinder plunger 51, will assist the motor piston 12 to generate pressure in the chamber 23 and thus in the brake cylinders 25. Pressure in the hydraulic chamber 33 will be generated solely by differential pressures affecting the piston 13.

It will be apparent that the bifurcated end 94 of the lever 88 moves freely along the stem 80 during initial operation of the brake mechanism. The spring 83 is so designed that the diaphragm 78 will remain in normal position until pressure in the chamber 75 reaches a point corresponding to the degree of energization of the motor 10 necessary to initially engage the brake shoes with the brake drums. During such initial portion of the operation of the mechanism, therefore, the operator is called on to exert only sufficient force against the pedal 52 to overcome the force of the springs 120 and 121. Thus a soft initial pedal is provided, which has been found highly desirable.

The lever 88 is movable at its upper end to the left of the lap valve position shown in Figure 2 to release the valve 109 to be opened by air pressure in port 114 to build up pressure in the chamber 75, without initially contacting the abutment 84. The bifurcated lever end 94 will be arranged in close proximity to the abutment 84 when the pressure in the chamber 75 increases to the point where it is ready to overcome the compression of the spring 83. After the initial stage of brake operation, therefore, an increase in pressure in the chamber 75 will move the diaphragm 78 toward the right of the position shown in Figures 1 and 2, whereupon the abutment 84 will engage the lever ends 94, and differential pressures urging the diaphragm 78 toward the right will oppose movement of the upper end of the lever 88 toward the left in Figures 1 and 2. The diaphragm 78 thus provides reaction means opposing movement of the plunger 66 toward the left in Figures 1 and 2, and the reaction increases as pressure in the chamber 75 increases. The latter pressure, in turn, determines the degree of energization of the motor 10. Because of the relative lever lengths between the stem 80 and boss 91, a relatively small diaphragm 78 may be used and obviously may be designed to give any proportionate reaction against the foot pedal. However, the play between the upper end of the lever 88 and the abutment 84 prevents the transmission of any reaction against the foot pedal until the brake shoes have been brought into contact with the drums.

If pressure in the chamber 53 should fail for any reason, for example, for lack of hydraulic fluid or a failure of the master cylinder plunger cup, movement of the pedal 52 will not generate pressure in the chamber 53 to actuate hydraulically the plunger 66. Under such conditions, continued movement of the pedal 52 will engage the plunger 51 against the axial extension 67, and direct mechanical force will be transmitted from the plunger 51 through plunger 66 to the lever 88 to operate the valve mechanism in the same manner as before. The arrangement thus provides a highly important safety feature the operation of which accomplishes a controlled application of the brakes in the same manner as if the plunger 66 had been hydraulically operated. The arrangement thus is simple and compact and is highly advantageous over the use of a dump valve, operable by the pedal 52 beyond its normal path of travel for supplying air to the motor chamber 14. The latter arrangement, now in use, provides an important measure of safety in the operation of a system of this kind but does not provide for controlled application of the brakes.

Assuming that the plunger 51 fails to generate pressure in the chamber 53, it will be apparent that no fluid will be displaced through line 44 into the chamber 22, hence fluid will not be forced through or past the plunger 20 in the manner referred to above. Assuming that fluid is present in the chamber 23, however, the emergency operation of the brakes in the manner described will cause the application of all of the brakes solely by booster motor power. If the failure should be such that there is a loss of fluid from the chamber 23, the piston 12 will move freely without applying the brakes associated with the wheel cylinders 25, but an emergency application of the other set of brakes will be accomplished by actuation of the piston 13 and its associated plunger 32.

From the foregoing, it will be apparent that the present system provides for efficient operation of the brakes in the type of system in which the booster motor is energized by actuation of a control valve mechanism by fluid displaced from a pedal operable master cylinder. The mechanism combines the valve mechanism with the pedal operable master cylinder, as distinguished from prior systems in which the valve mechanism is associated with the booster motor. The master cylinder is relatively compact and space is available for the mounting of the valve mechanism in the manner disclosed. The booster motor may be arranged wherever convenient space is available therefor, regardless of its position relative to the master cylinder.

The system is also operable in conjunction with a booster motor having a single pressure responsive unit for generating brake applying pressures. It has been found, however, that the system is particularly applicable for use with dual piston motors of the type described.

The combining of the valve mechanism with the pedal operable master cylinder is highly advantageous over the use of a dump valve for the reason described above. Preferably both the plungers 51 and 66 are coaxial as shown. The plunger 66 is directly operable by hydraulic pressure in the chamber 53, and yet it is operable with equal ease through direct contact of the plunger 51 with the axial extension 67 to insure application of at least some of the brakes if pressure in the chamber 53 fails.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster motor mechanism comprising a fluid pressure motor having a pressure responsive unit, a valve mechanism connected to said motor and to sources of different pressures to control energization of said motor and normally positioned to balance pressures on opposite sides of said pressure responsive unit, a hydraulic pressure responsive element connected to said valve mechanism and movable from a normal position to operate said mechanism, a hydraulic pressure generating member, chamber means in which said member is movable to generate pressure to move said pressure responsive element, and means arranged between said element and said member and operative upon a failure of pressure in said chamber means for effecting direct operation of said pressure responsive element by said pressure generating member.

2. A mechanism according to claim 1 wherein said chamber comprises a cylinder, said pressure responsive element and said pressure generating member comprising plungers operable in said cylinder, said pressure generating member having a normal range of movement from a normal off position to generate pressure in said cylinder to operate said pressure responsive element and being engageable with the latter upon movement beyond said normal range to directly actuate said pressure responsive element.

3. A booster motor mechanism comprising a fluid pressure motor having a pressure responsive unit, a valve mechanism connected to said motor and to sources of different pressures to control energization of said motor and normally positioned to balance pressures on opposite sides of said pressure responsive unit, a cylinder, a pressure responsive plunger in said cylinder, said valve mechanism comprising an element biased into engagement with said plunger to be operated thereby, a pressure generating plunger in said cylinder spaced from said pressure responsive plunger and cooperating with the latter and with said cylinder to form a hydraulic chamber, and means for moving said pressure generating plunger from a normal off position to generate pressure in said chamber to move said pressure responsive plunger and move said element to operate said valve mechanism and energize said motor, said pressure generating plunger being spaced from said pressure responsive plunger for movement through a normal range to generate pressure in said chamber to operate said pressure responsive plunger and engageable with the latter to effect operation of said valve mechanism upon a failure of pressure in said chamber.

4. A mechanism according to claim 3 provided with reaction means connected to oppose movement of said pressure responsive plunger from a normal off position to a degree proportional to the degree of energization of said motor.

5. A mechanism according to claim 3 provided with reaction means connected to oppose movement of said pressure responsive plunger from a normal off position to a degree proportional to the degree of energization of said motor, means providing a lost motion connection between said reaction means and said valve mechanism, and means biasing said reaction means to a normal position whereby said reaction means becomes responsive to energization of said motor only after such energization has taken place to an extent necessary to overcome said biasing means and take up said lost motion connection.

6. A booster motor mechanism comprising a differential fluid pressure motor having a pressure responsive unit one side of which is subject to relatively constant pressure of a low pressure source and at the other side of which is a variable pressure chamber, a control mechanism for said motor comprising a valve mechanism connected to said chamber and to sources of high and low pressures and having a normal position balancing pressures on opposite sides of said pressures responsive unit and movable from such position to unbalance such pressures, and a hydraulic fluid pressure responsive member connected to said valve mechanism and having a normal position from which it is movable to operate said valve mechanism, a hydraulic chamber in which said fluid pressure responsive member is arranged, a hydraulic pressure generating member movable into said hydraulic chamber from a normal inoperative position to generate pressure in said chamber and move said fluid pressure responsive member, said pressure generating member having a range of movement from said normal position to generate hydraulic pressure in said hydraulic chamber beyond which range of movement, upon a failure of pressure in said hydraulic chamber, said pressure generating member will mechanically engage said pressure responsive member to directly actuate it.

7. A mechanism according to claim 6 provided with reaction means connected to said control mechanism to oppose movement of said pressure responsive member during its movement away from its normal position.

8. A mechanism according to claim 6 provided with reaction means connected to said control mechanism to oppose movement of said pressure responsive member during its movement away from its normal position, and means for delaying the transmission of forces from said reaction means to said control mechanism during initial movement of said pressure responsive member from its normal position.

9. A mechanism according to claim 6 provided with a pair of chambers one of which is connected to said variable pressure chamber and the other of which is connected to said low pressure source, said one chamber being subject to control by said valve mechanism, and means responsive to differences in pressures in the chambers of said pair and connected to said control mechanism to oppose movement of said pressure responsive member during its movement away from normal position.

10. A mechanism according to claim 6 provided with a pair of chambers one of which is connected to said variable pressure chamber and the other of which is connected to said low pressure source, said one chamber being subject to control by said valve mechanism, a diaphragm separating the chambers of said pair, means providing a lost motion connection between said diaphragm and said control mechanism when pressures in the chambers of said pair are balanced and said diaphragm is in normal position whereby said diaphragm is movable a predetermined distance when pressures become unbalanced in the chambers of said pair before force is transmitted from said diaphragm to said control mechanism, and means biasing said diaphragm to said normal position when pressures are balanced in the chambers of said pair.

11. A booster mechanism comprising a differential fluid pressure motor having a pressure responsive unit one side of which is subject to relatively constant pressure of a low pressure source and at the other side of which is a variable pressure chamber, a control mechanism for said motor comprising a cylinder, a housing carried by said cylinder and forming a control chamber communicating with said variable pressure chamber, a normally closed high pressure valve between said control chamber and a source of high pressure, a normally open low pressure valve connecting said control chamber to said source of low pressure, and means comprising a hydraulic pressure responsive plunger in said cylinder connected to said valve mechanism to open said high pressure valve and close said low pressure valve upon movement of such plunger from a normal position, and a pressure generating plunger in said cylinder defining with such cylinder and with said hydraulic pressure responsive plunger a hydraulic chamber in which pressures are generated by said pressure generating plunger to move said pressure responsive plunger and operate said valves, said pressure generating plunger having a normal range of movement from its normal off position free of said pressure responsive plunger and beyond which range, upon a failure of pressure in said hydraulic chamber, said pressure generating plunger engages said pressure responsive plunger to move the latter and operate said valves.

12. A mechanism according to claim 11 provided with reaction means subject to operation in accordance with operation of said motor for opposing movement of said pressure responsive plunger during movement thereof away from its normal position.

13. A mechanism according to claim 11 provided with a diaphragm having one face subject to pressure in said control chamber and its other face subject to pressure of said low pressure source, a lever mechanism connected between said pressure responsive plunger and said valves to operate the latter, and means for transmitting force from said diaphragm to said lever mechanism to oppose operation of said valves by said pressure responsive plunger upon an increase in pressure in said control chamber.

14. A mechanism according to claim 11 provided with a diaphragm having one face subject to pressure in said control chamber and its other face subject to pressure of said low pressure source, a lever mechanism connected between said pressure responsive plunger and said valves to operate the latter, means providing a lost motion connection between said diaphragm, when the latter is in a normal position, and said lever mechanism when said control chamber is connected to said low pressure source, and means biasing said diaphragm to said normal position whereby a predetermined increase in pressure in said control chamber must occur before said lost motion connection is taken up for transmitting force from said diaphragm to said lever mechanism to oppose movement of said pressure responsive plunger.

15. A booster mechanism comprising a differential fluid pressure motor having a pressure responsive unit one side of which is subject to relatively constant pressure of a low pressure source and at the other side of which is a variable pressure chamber, a control mechanism for said motor comprising a casing forming a control chamber communicating with said variable pressure chamber, said casing having a pair of ports one of which communicates with said low pressure source and the other of which communicates with a source of higher pressure, a normally open low pressure valve for said low pressure seat, a normally closed high pressure valve for said high pressure seat, a rockable beam connected to said valves, a pivoted lever having engagement with said beam, and a pressure responsive plunger engaging said lever, a cylinder in which said pressure responsive plunger is slidable, and a fluid displacing plunger movable into said cylinder to generate pressure to operate said pressure responsive plunger to rock said lever and move said beam to close said low perssure valve and open said high pressure valve, said fluid displacing plunger having a normal position from which it is movable through a predetermined range free of said pressure responsive plunger and beyond which range, upon a failure of pressure in said cylinder, said fluid displacing plunger engages said fluid pressure responsive plunger to directly actuate the latter.

16. A mechanism according to claim 15 provided with reaction means connected to said control mechanism for opposing movement of said fluid pressure responsive plunger during energization of said motor.

17. A mechanism according to claim 15 provided with reaction means connected to said control mechanism for opposing movement of said fluid pressure responsive plunger during energization of said motor, and means connected to said reaction means for delaying the application of forces therefrom to said fluid pressure responsive plunger until after initial energization of said motor.

18. A mechanism according to claim 15 provided with a diaphragm carried by said casing and having one side open to said control chamber, the other side of said diaphragm being subject to the pressure of said low pressure source, and means connected to transmit reaction forces from said diaphragm to said lever upon a predetermined increase in pressure in said control chamber.

19. A mechanism according to claim 15 provided with a diaphragm carried by said casing and having one side open to said control chamber, the other side of said diaphragm being subject to the pressure of said low pressure source, lost motion means connected between said diaphragm and said lever, and means biasing said diaphragm to a normal position from which said diaphragm is movable a predetermined distance before taking up said lost motion connection whereby said diaphragm is effective for opposing movement of said lever only after pressure in said control chamber has increased to a predetermined point.

References Cited in the file of this patent

UNITED STATES PATENTS

| | | |
|---|---|---|
| 2,239,751 | Kritzer | Apr. 29, 1941 |
| 2,373,272 | Stelzer | Apr. 10, 1945 |
| 2,404,932 | Stelzer | July 30, 1946 |
| 2,406,328 | Gunderson | Aug. 27, 1946 |
| 2,464,367 | Balogh et al. | Mar. 15, 1949 |
| 2,532,960 | Stelzer | Dec. 5, 1950 |
| 2,587,403 | Stelzer | Feb. 26, 1952 |
| 2,705,402 | Stelzer | Apr. 5, 1955 |
| 2,812,639 | Whitten | Nov. 12, 1957 |
| 2,852,920 | Stelzer | Sept. 23, 1958 |